TELETYPE CURRENT SUPPLY SYSTEM

Filed March 8, 1961

INVENTORS
JOHN C. LOVCI
ALLEN A. YUREK

BY W. O. Quesenberry
Claude Funkhouser
ATTORNEYS

TELETYPE CURRENT SUPPLY SYSTEM

Filed March 8, 1961

INVENTORS
JOHN C. LOVCI
ALLEN A. YUREK

BY W. O. Duesenberry
Claude Funkhouser
ATTORNEYS

TELETYPE CURRENT SUPPLY SYSTEM

Filed March 8, 1961 5 Sheets-Sheet 3

INVENTORS
JOHN C. LOVCI
ALLEN A. YUREK

BY W. O. Quesenberry
Claude Funkhouser
ATTORNEYS

TELETYPE CURRENT SUPPLY SYSTEM
Filed March 8, 1961 5 Sheets-Sheet 4
FIG. 8
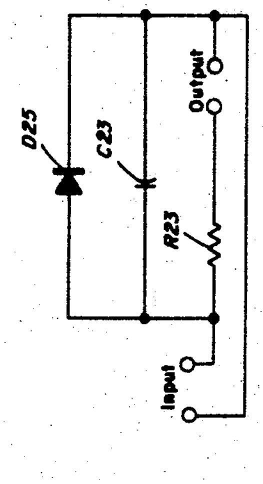
FIG. 9
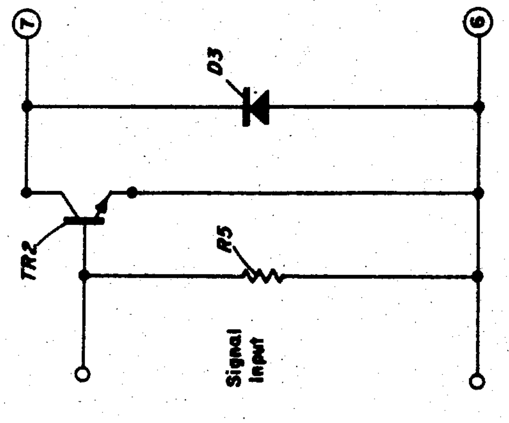
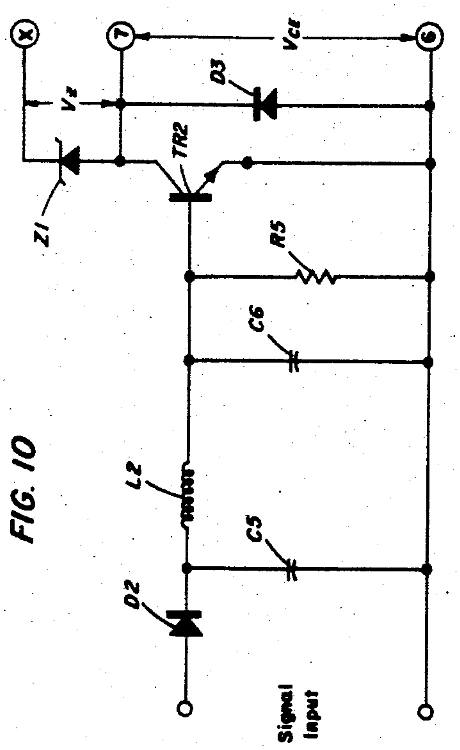
FIG. 12
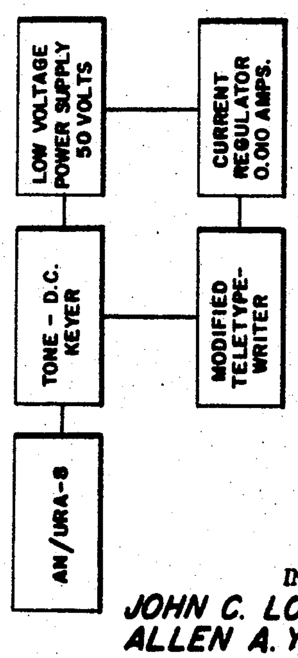
INVENTORS
JOHN C. LOVCI
ALLEN A. YUREK
BY W. O. Quesenbery
Claude Funkhouser
ATTORNEYS

TELETYPE CURRENT SUPPLY SYSTEM

Filed March 8, 1961 5 Sheets-Sheet 5

INVENTORS
JOHN C. LOVCI
ALLEN A. YUREK

BY W. O. Quesenbery
Claude Funkhouser
ATTORNEYS

United States Patent Office 3,226,563
Patented Dec. 28, 1965

3,226,563
TELETYPE CURRENT SUPPLY SYSTEM
John C. Lovci, 5813 Brunswick St., Springfield, Va., and Allen A. Yurek, 6012 Merchant Road, Camp Springs, Md.
Filed Mar. 8, 1961, Ser. No. 94,406
4 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

The present invention relates to an isolated signal converter and more particularly to a current supply and tone converter for an isolated signal converter in a keying loop which is used for teletype and other binary keying systems.

Heretofore, teletypewriters and binary keying systems have used the signal as a series loop keying means. In such a system the disadvantage as opposed to the instant device, is that the signal is dissipated and distorted by the recording means itself. Such means, for example, might be relay coils, dropping off signal voltage and distorting it as the voltage is fed through the successive recording inductances. Another common and related problem is that signal voltage must be kept high in conventional teletypewriters; a factor presenting a shock hazard, especially on a shipboard installation where salt water is an ever present challenge. Moreover, a typical mobile installation, such as that aboard a ship demands that the voltage be kept as low as possible to present a minimum power supply problem.

However, the problem is broader than that of a teletypewriting system and the problems solved extend to most existing keying systems which utilize some type of electromechanical relay having series inductances in the loop. In off-on keying operations their inductance causes inductive kicks in the current wave form, thus distorting the wave form. A single inductance in a loop presents somewhat of a problem. But as additional devices are series connected into the loop, eventually the current wave becomes so distorted that the transmission of intelligence is no longer possible.

Thus, the keying systems presently used have the disadvantage of distorting the information as the signal is fed into them, accentuated by the removal or addition of new units. They have a high level line signal which can present a shock hazard and potentially electrical interference with other communication systems, and the signal strength is itself dissipated by the energy needed to move the translating element, very often a relay coil and armature.

In order to overcome these difficulties it was decided, according to the present invention, to devise a system which would not change the keyed wave form. The problem was first faced in regards to teletypewriters. Here, in a series of typing units constituting a teletypewriter loop there was inserted a resistive signal converting solid state means in place of the inductances.

There was the further problem that the teletypewriter would not operate at a satisfactory high efficiency below the power level of 50 volts at 0.060 ampere. Hence, to remedy this the new resistive converting means were adapted so as to use resistances responsive to power sources of virtually any low level of voltage and amperage, depending only upon the degree of amplification desired and the strength of the incoming signal. Hence, the system was not tied to a relatively high power level but could be used for extremely low power signals. To accompilsh this purely resistive conversion and low power dissipation in a teletypewriter digital keyer signal system, a solid state digital keyer isolation device was evolved. The embodiments all have at least three parts. The first unit is a keying oscillator which obtains its voltage from the key loop of 0.010 ampere at 8 volts. This input unit, being resistive, presented almost no distortion to the teletype loop circuit no matter how many units were added. The wave shape of the keyed signal was not appreciably altered by the addition or subtraction of machines in such a loop circuit. The second unit is a D.C. switch inductively coupled to the keying oscillator. This was devised so that each teletypewriter would have an independent power supply thus removing the interaction of quantities of machines in a given teletype loop circuit. The third unit was one providing an independent voltage source with each teletypewriter position. This method provided a quick means of keying and monitoring a radio transmitter signal. Here the voltage keying signal would not change with the addition and/or subtraction of teletypewriter units in a loop circuit. This showed that a teletype loop could be maintained without producing any noticeable distortions.

Thus, the provisions of an isolated signal translator means using a resistive load for the signal avoided the problems and pitfalls as indicated above connected with the prior art signal translation systems; that is, the problems of dissipation of a signal power necessitating a relatively fixed power level of signal and making it difficult to translate a low power signal due to the distortion of the signal by its interaction with the load, and the disruption of the level of translation efficiency by deleting translator units.

Given the isolated signal translator system a pressing need arose for a power supply therefor, having a constant current output, supplied from a conventional 115 A.C. input and automatically adjusting the total power output when loop impedances are removed or added so that the current level remains at a predetermined level. This the invention accomplishes.

One object of this invention is to provide regulating constant current supply for a signal converter.

Another object is to provide a tone to D.C. converter for a signal converter.

A still further object is to provide power supply for a low voltage, low current signal translator, especially apt for portable installations.

Yet another object of this invention is to provide a signal translator whose low level line signal obviates shock hazard especially on shipboard installations and minimize electrical interference with nearby systems.

Another object is to provide complete D.C. isolation between line and receiver.

Still another object is to provide a signal translator which essentially presents only a small resistive load to the signal.

Another object is to provide a signal translator capable of high speed operation far beyond the capabilities of electromechanical relays.

Another object is to provide a polarity correcting input circuit.

Still another object is to provide a polarity protecting output circuit.

Another object is to provide a wave shaping network for an internal loop inductive load.

A further object is to provide an overvoltage protection across a transistor simply by means of a diode.

Another object is to provide a Zener diode voltage adjuster for an output transistor.

Other objects and many of the attendant advantages of this invention will be readily appreciated as the same becomes better understood by reference to the following detailed description when considered in connection with the accompanying drawings wherein:

FIG. 1 schematically illustrates the circuit of the solid state digital isolation keyer of the present invention;

FIG. 8 schematically illustrates a wave shaping circuit for use in a teletype or other pulsed voltage signal output;

FIG. 9 shows a diode overvoltage and reverse voltage protector circuit for a solid state device; and FIG. 10 is a schematic illustration of a Zener diode used as a transistor protective device.

Figure 11:
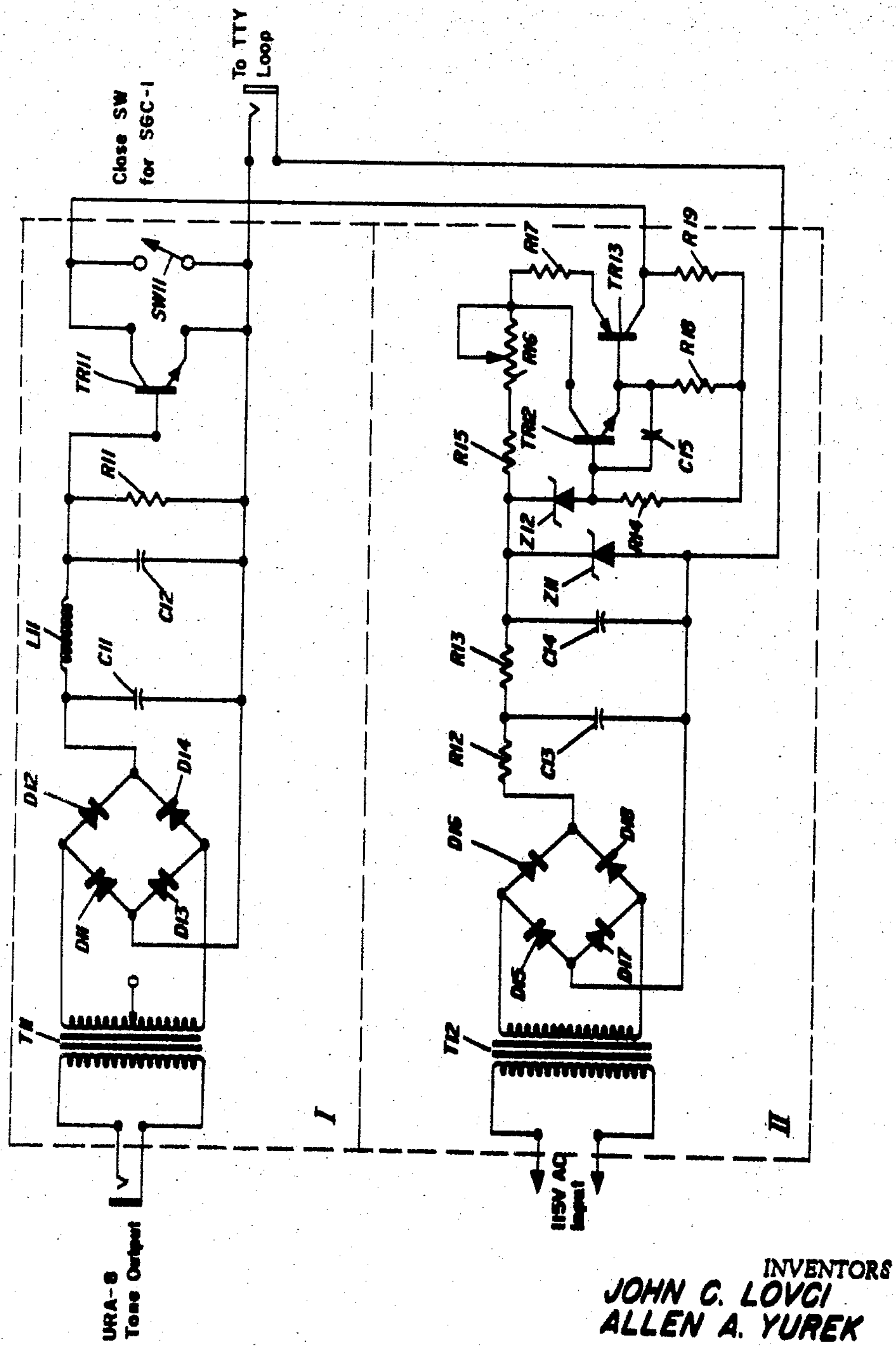

FIG. 11 shows the tone to D.C. converter circuit (part I) in combination with the constant current supply (part II);

FIG. 12 shows a block diagram of a teletype loop using a keyed tone with tone-to-D.C. converter and regulated current supply.

This new and unobvious system is adaptable for a wide variety of signal translating information storage systems such as a binary keying system and a computer, a teletypewriter, a missile programmer, a relay system, and the like. Its real advantage lies in the provision of a pure resistance load on the signal.

Figures 1, 2:
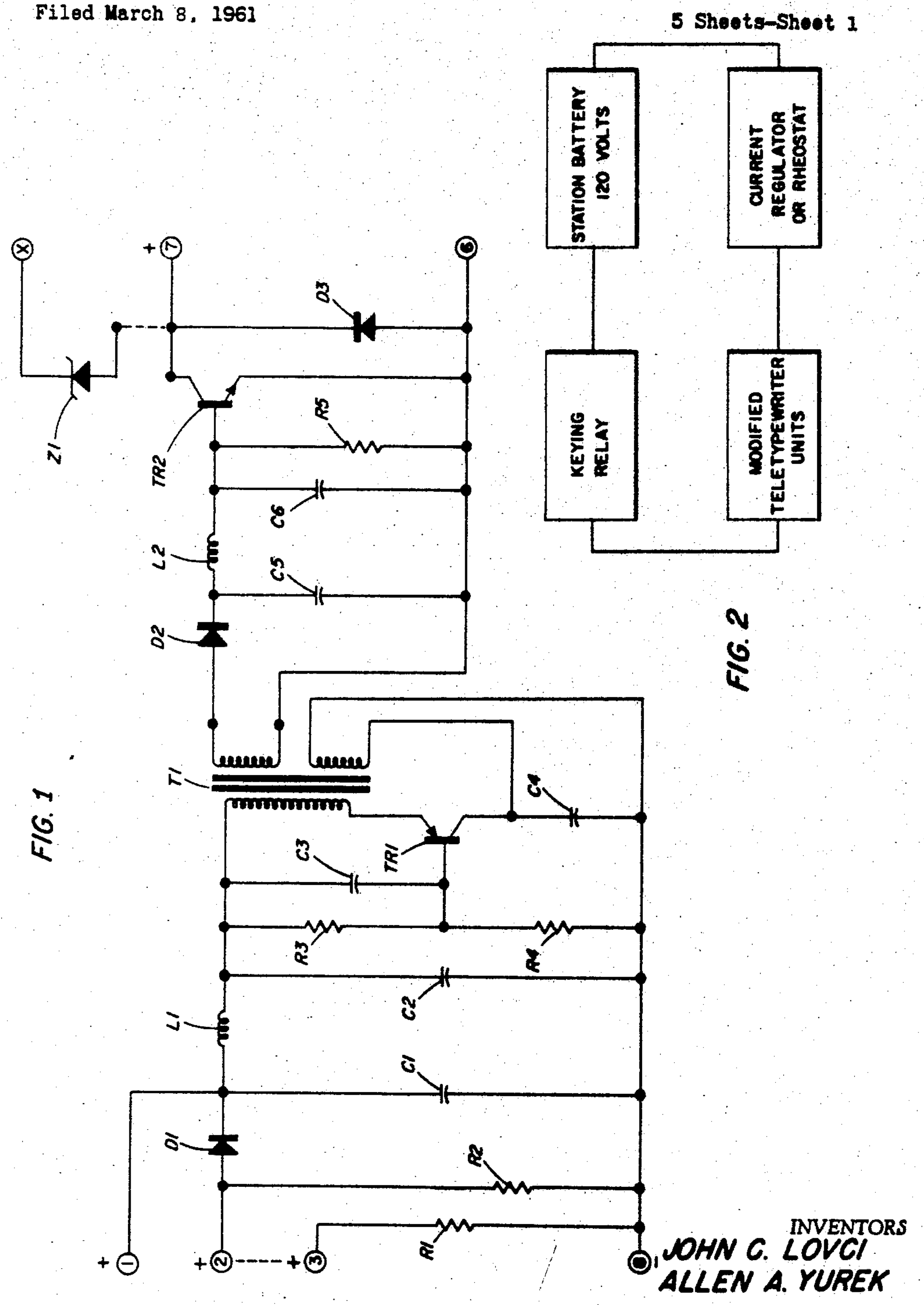
FIG. 2 is a block diagram of the essential components of any teletype loop.

In the embodiment illustrated in FIG. 1 there is provided the isolation signal keyer system of the present invention. When a signal appears across terminals 1 and 8, its load drain will be through TR1 and voltage dividers R3 and R4. The signal typically will be filtered through L1, C1, C2 and after its voltage has been applied to TR1, the oscillating transistor, it will apply voltage across the primary of coupling transformer T1 resulting in oscillation through the tank circuit in the secondary winding associated with C4 and provide a pulsed A.C. signal at the other secondary winding of T1. Rectifier D2 rectifies this signal sending it through filter L2, C5, C6 producing a square wave input at switching transistor TR2. This voltage pulse impressed upon the base of TR2 effects a passage of current from collector to emitter and thus effects an output to a signal storing and recording means across terminals 6 and 7. Thus, there is effected a complete D.C. isolation of the signal keying means from the signal storing and recording means. Diode D3 is used to protect switching transistor TR2 from overvoltages, for example, kick-back voltages from a relay coil across 7 and 6, and/or reversed polarity applied between terminals 7 and 6.

In FIG. 2 the block diagram shows a typical teletype loop circuit using a conventional power supply system with or without a current regulating device. Here, the standard components of a teletypewriter loop are shown. The teletype bank of units indicated could include the proposed system with the digital isolation keyer and with local 60 ma. power supply.

Figure 3:
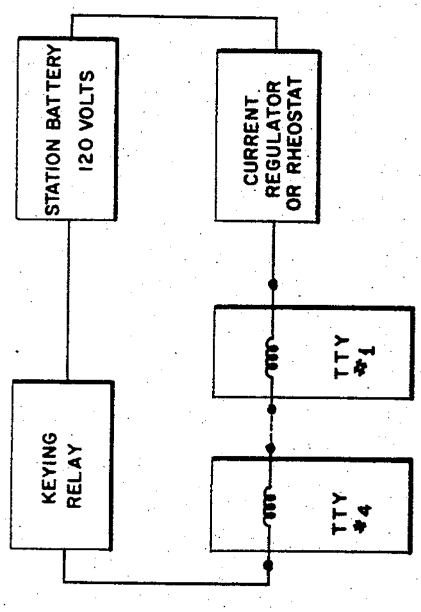
FIG. 3 is a block diagram of the teletype loop of FIG. 2 and showing the inductive signal translation means, heretofore used in the prior art.

In the embodiment shown in the simplified schematic circuit diagram of FIG. 3, the loop circuit includes an inductive conversion means as known heretofore, wherein the signal is passed through a signal distorting and dissipating inductance in each teletypewriter unit.

In FIG. 3 it should be noted that the prior art teletypewriter bank, as indicated by the dotted line insertion, included the distortion-producing inductive means as a signal load and was limited to four ordinary teletypewriter units. More units than this produced too much distortion for practical efficiency. By contrast, in the modified teletypewriter bank, as in FIG. 4, theoretically an infinite number of units could be used since there is substantially no distortion. The only theoretical limit on the number of teletypewriter units here is set by the power dissipation of the purely resistive load and this in turn is limited only by the degree of amplification desired. Accordingly, a very low voltage signal may still be used and will experience substantially no distortion by virtue of traversing the load of the signal translation teletypewriter equipment. Thus, the proposed isolation keyer system has, in effect, enlarged a four unit bank into a bank of theoretically an infinite number of units.

Figure 4:
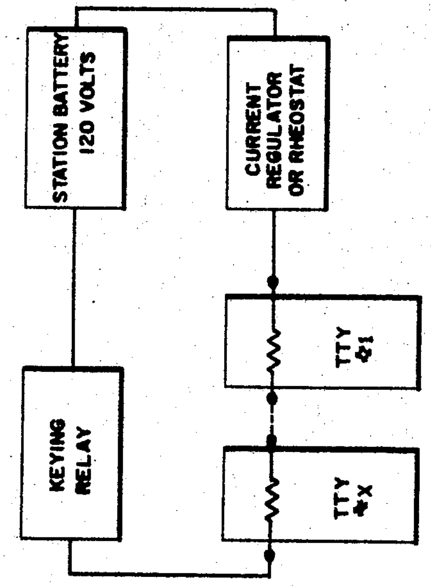
FIG. 4 is a block diagram of a teletype loop and schematically illustrates the substitution of the solid state resistive means substituted for the inductive means of the prior art.

FIG. 4 shows a circuit such as that illustrated in FIG. 3 wherein a resistance load of very low voltage drain and no distortion characteristics is shown as substituted for the distorting load in the signal loop of FIG. 3.

Figure 5:
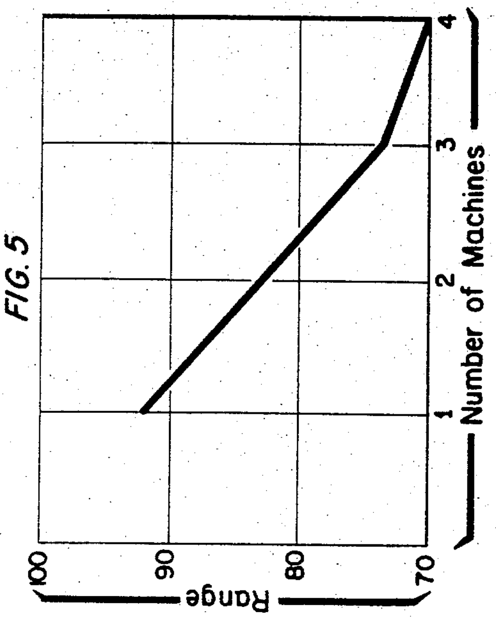
FIG. 5 is a graphical representation of machine range plotted against number of machines used in a conventional teletype loop at 120 volts and 0.06 ampere.

FIG. 5 is a graphical comparison of the orientation range loss. This loss is due to addition and/or subtraction of the teletypewriter machine in a teletype loop circuit. It is a measure of machine range versus number of machines in a loop circuit operating at 120 volts, 0.06 ampere. Otherwise expressed this might be said to compare the degree of distortion acceptable in a signal against the number of machines in a loop translating this signal. Machine "range" may be defined as the degree of bias distortion acceptable in a given machine. A range of 72 is ordinarily taken as a good characteristic range for a teletypewriter. This arbitrary range factor is empirically arrived at. For example, 50 percent distortion would be a range of one hundred. This graph illustrates how the range of signals acceptable to a bank of machines is sharply attenuated by the addition of machines. Notice should be taken of the amount of range loss with the additional machines added to the loop. With a single machine the range was 92 points and with a fourth machine added this range had dropped to 70 points, a loss of 22 points of range. The comparison could not be projected beyond this quantity as the circuit failed to function with a fifth machine added to the loop. This figure should be illustrative of the teletype loop as used without the invention. The comparable loss of range in a system using the invention is shown in FIG. 6.

Figure 6:
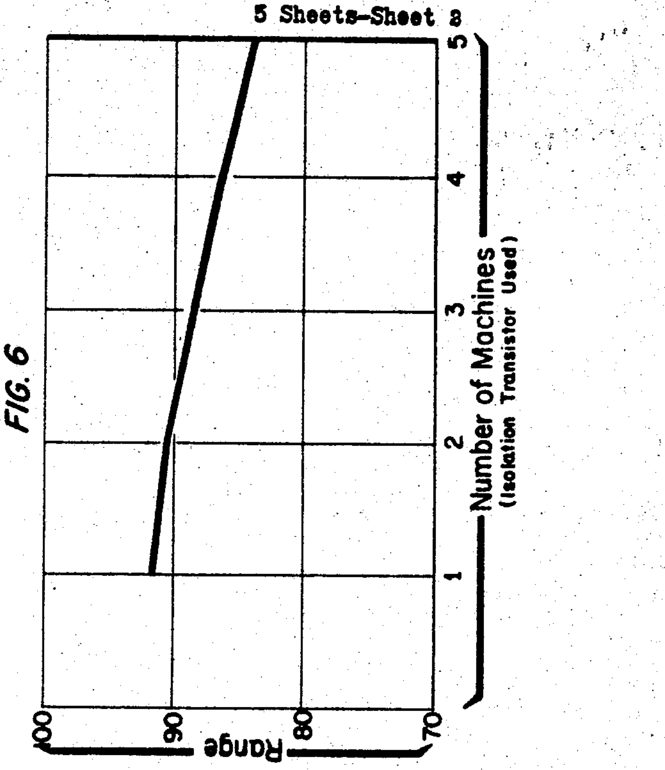
FIG. 6 is a graphical representation of machine range plotted against number of machines used where the solid state translator is used at 50 volts, 0.01 ampere in accordance with the present invention.

In FIG. 6 there is plotted machine range versus number of machines in a loop circuit operating at 50 volts, 0.01 ampere and using the resistive translator. Comparing the graph of FIG. 5 with that of FIG. 6 it will be noted that the range loss was 5.5 with four machines in the loop and 7 points with five machines in the loop. Six machines could be used in this loop without appreciable range loss. Six machines each have an approximate 8 volt drop or a total of 48 volts, and would dissipate substantially the source voltage of 50 volts. Consequently, the number of machines can be increased by raising the source voltage. Conversely, the source voltage needed can be lowered by reducing the number of machines in a teletypewriter loop circuit using the present invention.

Although the curves for the circuit used with the isolation keyer in FIG. 6 are based on a teletype loop circuit being operated with .01 ampere with 50 volts, this system functions as well as .02 ampere and 120 volts or .06 ampere and 120 volts. Such arrangements may be provided for in the unit. However, this is not a limiting factor for this system. It is contemplated that, with the proper shielding and the addition of solid state amplifiers, this system will function with current in a micro-amp range at voltages in the millivolt order of magnitude. It is evident that in a system using the invention, as opposed to one without the invention, there is no real limitation on the range of the bank of machines due to distortion by the signal translating means, and also there is considerably less voltage drop per machine in that the translating means is a load drain type as opposed to the prior art. In addition, the use of the present invention enables voltage to be maintained at lower, safer, and more practical levels consistent only with the drop across the resistance of the machine. Thus, the voltage level need not be maintained high to prevent distortion. Also, the system as modified by the invention could be used with a keying switch voltage of 120 volts in lieu of the present 50 volts by the procurement of a transistor which has an emitter to collector rating of 150 volts. The present transistors which can tolerate these high voltages are quite costly but as quantity demands increase for such units the price should reduce proportionately.

Extending the capabilities of the invention further, the speeds of keying could be considerably increased. The invention has been used on conventional 60 words per minute teletype machines, equal to 22.75 dot cycles. However, preliminary tests show that speeds around ten thousand dot cycles can be obtained providing all elements of the system are controlled, such as input impedance matching, removing capacitive filters, etc. With these circuit modifications, the only limitation would be the speed of the input oscillator. These keying speeds could be taken beyond the ten thousand dot cycle range if the keying oscillator speeds were increased.

Figure 7:
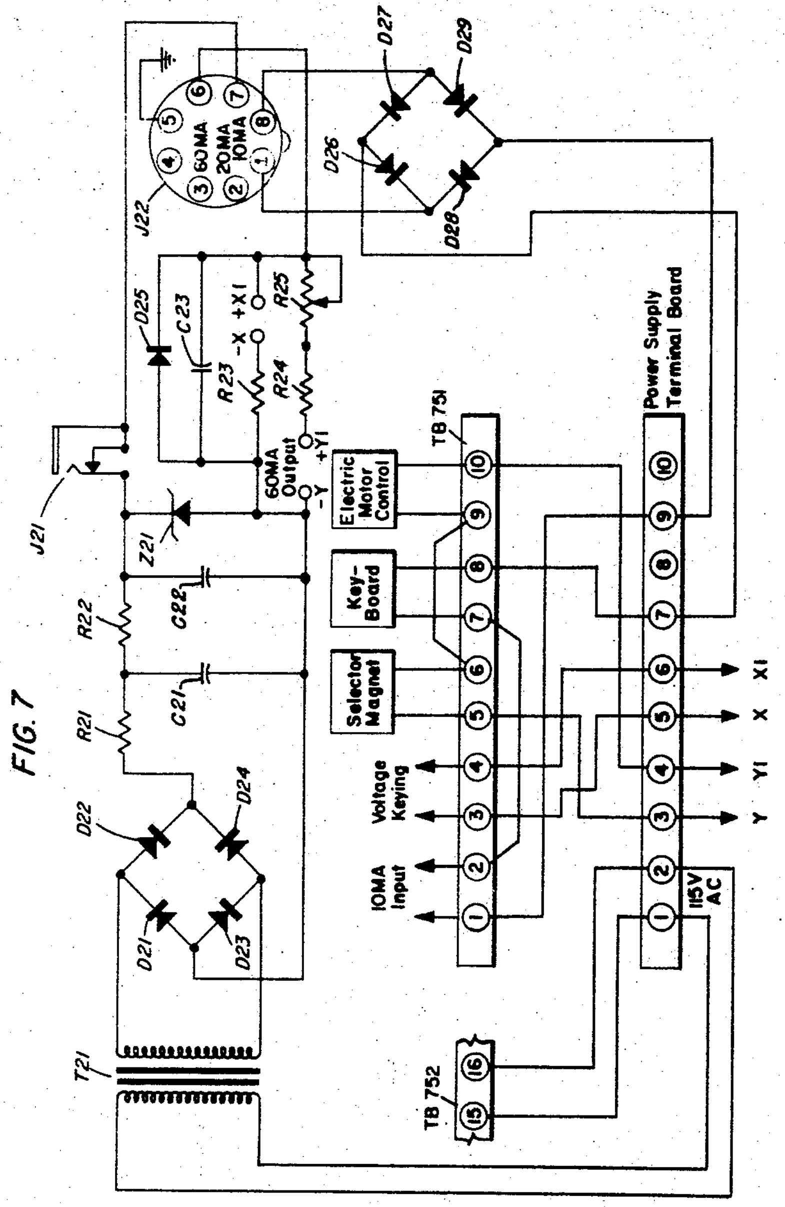
FIG. 7 depicts, schematically, the supporting power supply and control circuits for any conventional teletype system.

FIG. 7 illustrates an embodiment of the invention wherein the isolation keyer, its power supplies, keying means, and other supporting system are illustrated. This figure includes a 60 ma. power supply to be used in the invention. The voltage source is 60 cycles at 115 volts and is connected to transformer T21 the secondary winding of which is connected across a full-wave bridge rectifier consisting of diodes D21, D22, D23 and D24. The output of the bridge is connected in series to current limiting resistors R21 and R22 with filter capacitors C21 and C22, and across these is connected a voltage regulating Zener diode Z21 of the 50 volt type.

In series with the Zener diode is a meter jack J21 for reading selector magnet current and for monitoring selector magnet current wave forms. The socket J22 for the solid state digital isolation keyer is shown as being of the octal base type with one terminal to ground shield, one leading to the meter jack and power input, a further terminal leading to the bridge rectifier for polarity, the fourth across this rectifier. The remaining terminals are arranged for predetermined current inputs. The bridge rectifier consists of bridged diodes D26, D27, D28 and D29 arranged to assure that the correct polarity of the incoming 10 ma. signal is applied to the solid state digital isolation keyer. At outputs —Y and +Y the signal for the selector magnet for teletypewriters may be arranged to appear being of the order of the 60 ma. Under such conditions, the current limiting resistor R24 and current limiting potentiometer R25 are adjusted to 60 ma. and connected in series to the keyer. At the output position —X, +X, the signal is arranged to be applied to a transmitter. This arrangement enables the invention to be used as a relay station whereby the signal is transmitted from a radio transmitter to a radio receiving station, using the low drain, no distortion isolation keying device of the proposed invention. Arranged across these output terminals is a voltage keying pulse isolation resistor R23 and a wave shaping circuit consisting of a diode D25 in parallel with a capacitor C23.

Shown in FIG. 8 is the wave shaping circuit. The wave shaping circuit functions as follows. For pulses in the working direction with the desired polarity, the combination diode and capacitor have no effect on such pulses and do not influence the wave. But when these pulses are combined with back pulses, as for example a kick-back pulse from a coil, the diode and capacitor act as a short circuit clipping off these extraneous pulses in the undesired direction. This tends to reduce the voltage wave to the desired shape, which is the purpose of the circuit. It also protects the teletypewriting magnet heads from back-pulsing in that it presents an open circuit in that back direction barring pulses in that direction.

FIG. 9 shows a diode overvoltage protector circuit for a solid state device which may be damaged by back-voltages of sufficient magnitude. Diode D3 is chosen so that it will conduct at a voltage level just below the maximum safe back-voltage on the solid state device to be protected, such as switching transistor TR2. Then, diode D3 is placed in parallel across the solid state device with its polarity arranged so as to conduct when back-pulses are presented across the solid state device, that is voltage of reverse polarity from normal operating voltage. Such a back-pulse might occur in the instant embodiment, when a coil in the circuit across terminals 6 and 7 is energized, yielding a kick-back pulse. Another advantage over the prior art is that of low impedance back-voltage protection. The prior art has used a diode to protect a transistor by placing it in series therewith. The resulting combined impedance is of the form $$Z_{S_o}=Z_T+Z_D$$

where $Z_{S_o}$ is total impedance, $Z_T$ is transistor impedance and $Z_D$ is diode impedance. But this is more impedance for the closed circuit state, than the invention provides. The parallel arrangement of the invention has a lower combined impedance being of the form $$Z_S=\frac{Z_T Z_D}{Z_T+Z_D}$$

Hence $$Z_S=\frac{Z_{S_o}Zd-Z_D^2}{Z_{S_o}}$$

or $$Z_D-Z_D^2/Z_{S_o}$$

Therefore $Z_S$ is less than $Z_{S_o}$.

In the embodiment shown in FIG. 10 of a Zener diode used in a transistor output line, a new use for Zener diodes is illustrated. Here, the Zener diode acts as a precise, one-way voltage regulator against back over-voltage pulses from terminal (X) to the transistor which might easily destroy it. The voltage dropped off by the Zener $V_Z$ will be such that it drops off enough from an anticipated overvoltage $V_S$ at terminal (X) to maintain the maximum applied voltage at or below the collector-emitter breakdown voltage level $V_{CE}$ of the transistor, and thus protect the transistor. Use of a Zener diode in such an output circuit extends the breakdown voltage range of a transistor. In formula form, $V_Z=V_S-V_{CE}$.

The principles of the instant invention have wide application in the design of signal translating systems of all types. They may obviously be applied to many variations and types of signal translators as already indicated, and are also applicable to signal translation systems other than teletypewriting systems. Moreover, many other possibilities exist in utilizing the described invention. For example, although the specific illustrations described in this application relate only to translating a signal, specifically a keyed signal, through a teletypewriting system, various other types of signal translation systems may be used in junction with this type conversion means. This translator has utility in any data processing system in which it is desirable to have a low drain on the signal, no distortion between successive signal translation means, such higher signal frequency than is presently practicable, little or no loss in range or change in power due to the insertion or removal of a translating unit, or any of the other previously mentioned advantages. Such an alternate system might be a radio transmitter using the signal, as converted by the D.C. isolation keyer, and applying it to the transmitter, the signal to be there-after received and relayed or recorded. The D.C. isolation keyer would have wide application in any kind of a binary information accepting device wherein electrical energy is converted to mechanical enery as for instance in a binary computer system. In this instance, where a high energy signal may have been needed before to perform the work of conversion, now a low energy signal can be used to control a high energy device with little loss in the conversion and no distortion.

The wave shaping circuit consisting of diode and capacitor in parallel has application in virtually any pulse modifying system.

The diode arranged across the transistor to protect it from overvoltage is an arrangement that will protect any transistor from this hazard. This Zener voltage regulation is apt for many regulation uses.

FIG. 11 shows the tone to D.C. converter and power supply circuits. Here the tone to D.C. converter is identified as Part I and the constant current power supply circuit as Part II. These specific embodiments are shown in a form especially adapted for use in the teletype signal conversion system as described in the instant case. However, their usefulness extends far beyond this particular application. In particular, the constant current supply has a myriad of other applications since there are a host of circumstances where the need exists for a current supply able to keep a constant predetermined output despite load variations. In Part I of FIG. 11, the tone-to-D.C. converter circuit is arranged as follows: The tone symbol is applied to a D.C. isolation transformer T–11, is rectified by a full wave rectifier bridge D–11 to 14, is filtered by an audio filter L11, C11, C12 and applied as a positive D.C. pulse at the base of a switching transistor TR11. TR11 has a base resistor R11 to hold it in an off position when no signal is applied. The signal causes TR11 to conduct sending a modified reflection of the tone signal to the teletype loop.

In cooperation with the tone-to-D.C. converter there is arranged a constant current power supply shown in Part II of FIG. 11. Here a 115 volt A.C. input is applied across the primary of transformer T12 (115 volts to 70 volts, 60 cycle type) whose secondary is in parallel with a bridge rectifier (full-wave type) consisting of diodes D15, D16, D17 and D18 and thence to 120 cycle filter consisting of R12, R13, C13 and C14 and across the Zener diode Z11. Z11 is a 50 volt Zener diode for voltage regulation and is operated in conjunction with Z12 a 10 volt Zener diode producing a reference voltage for base of TR12, and in conjunction with R14 a current limiting resistor and voltage divider. The current is passed through current limiting resistor R15 and current limiting potentiometer R16, adjusted to 10 ma., to the collector of D.C. amplifying transistor TR12 whose base voltage is taken from the base of Zener Z12. Oscillation of the transistor is prevented by capacitor C15. Base bias resistor R18 is connected to the emitter of switching transistor TR12 and also to the base of current regulating transistor TR13. The current regulating transistor has an isolation resistor R17 between its emitter and the collector of TR12 and it has a voltage divider resistor R19 for bias between the collector and the base bias resistor R18.

A typical operation of the combination illustrated is as follows: The 1785 cycle per second tone from input URA–8 is applied to the full-wave bridge D11, D12, D13 and D14 through the D.C. isolation transformer T11. The resultant rectified RF tone is filtered by C11, L11 and C12. The D.C. current pulses are applied to the base of transistor TR11 causing it to conduct from collector to emitter. The 10 ma. loop current is supplied from the power supply composed of T12, D15 through D18, R12, R13, C13 and C14. The Zener diode Z11 is arranged to pass about 10.5 to 11 ma. in a space condition and 0.05 to 1 ma. in a mark condition, maintaining a constant 50 volts across the Zener in both mark and space conditions, Z12, TR12 and TR13 and their associated components make up a constant current regulator which, when properly adjusted by potentiometer R16, holds the loop current to a constant 10 ma. with from 1 to 5 teletype machines in the loop supplied and also allows for large variations in loop line lengths.

Thus, as seen above, the signal translation system is supplied with a constant current power supply, irrespective of how many machines are put in or removed from the teletyping or signal translating loop. Thus, this type of constant current power supply eliminates the need of varying the loop resistance each time a loop characteristic is changed, for example, by removing one of the signal translators or teletypewriters, and acts as a constant current regulator. This regulator should be capable of maintaining 0.01 ampere at all times regardles of loop resistance changes.

Hence, the problem of providing a self-regulating constant current supply for teletype and other systems has been solved. The solution, moreover, is by a simplified, compact means using transistors and diodes. As seen above, this answers a long felt need in the art.

Moreover, a tone-to-D.C. converter circuit for use with the resultant current regulated signal converter system has been shown and described in a circuit likewise simplified and miniaturized by the adaptation of transistor and diode components.

Thus, a new and improved signal translation means has been provided which may be used in signal translation and recording systems to produce the superior qualities of low power drain, no distortion, and automatic power supply regulation. It is believed that this invention provides a new means for the conversion of keyed signal energy, in combination with a wave shaping network, diode means across a transistor to protect against overvoltage, the Zener voltage regulation means.

Obviously, many modificaitons and variations of the invention are possible in the light of the above teachings. It is, therefore, to be understood that the scope of the invention is to be considered as limited only by the scope and limitations of the appended claims.

What is claimed is:

1. A signal conversion system comprising:
a tone signal input source;
a tone-to-direct current converter connected to the tone signal input source;
an impedance element receiving the output of the tone-to-direct current converter;
a solid state element connected to the impedance element to provide an electrical oscillation in response to the signal from the tone-to-direct current converter;
a transformer;
the primary of said transformer connected to the solid state element to receive the electrical oscillation;
a self regulated solid state power supply;
a switching means connected to the power supply and to the secondary of the transformer to provide a regulated output signal whenever electrical oscillation is present.

2. The system of claim 1 further including:
a wave forming means connected to the output of the switching means to provide a signal suitable for radio transmission.

3. The system of claim 2 wherein the wave forming means includes:
input means;
output means;
a diode connected between the input and output means;
a capacitor connected across the diode; and
a load adjusting impedance means connected to the input terminal, the diode, and the capacitor.

4. A tone-to-direct current converter comprising:
an input transformer for receiving a tone signal;
primary and secondary windings for the input transformer;

a first bridge rectifying means connected across the secondary winding of the input transformer;

a solid state switch having base, emitter and collector electrodes, connected in parallel across the first bridge rectifying means;

a step-down transformer for receiving alternating current and having a primary and a secondary winding;

a second bridge rectifying means connected across the secondary of the step-down transformer;

input and output terminals for the second bridge rectifying means;

a voltage regulator connected in parallel across the output terminals of the second bridge rectifying means;

a Zener diode connected to one of the output terminals of the bridge rectifying means;

a solid state direct current amplifier having base, emitter, and collector electrodes, connected to one output terminal of the second bridge rectifying means;

means connecting the collector electrode of the direct current amplifier to the collector electrode of the solid state switch; and means connecting the first bridge rectifying means with the base electrode of the solid state switch, whereby the solid state switch passes current from the direct current amplifier when a tone signal is present on the input transformer primary.

References Cited by the Examiner

UNITED STATES PATENTS

| | | | |
|---|---|---|---|
| 2,832,900 | 4/1958 | Ford | 307—88.5 |
| 2,906,941 | 9/1959 | Brolin | 307—88.5 |
| 2,980,827 | 4/1961 | Hill | 307—88.5 |
| 3,015,723 | 1/1962 | Staples | 307—88.5 |
| 3,076,135 | 1/1936 | Farnsworth et al. | 307—88.5 |
| 3,119,027 | 1/1964 | Faust | 307—88.5 |
| 3,125,715 | 3/1964 | Brooks | 307—88.5 |

FOREIGN PATENTS

| | | |
|---|---|---|
| 1,047,935 | 12/1958 | Germany. |
| 866,227 | 4/1961 | Great Britain. |

JOHN W. HUCKERT, *Primary Examiner.*

DAVID J. GALVIN, *Examiner.*

UNITED STATES PATENT OFFICE

CERTIFICATE OF CORRECTION

Patent No. 3,226,563 December 28, 1965

John C. Lovci et al.

It is hereby certified that error appears in the above numbered patent requiring correction and that the said Letters Patent should read as corrected below.

In the drawings, Sheets 1 to 5, and in the heading to the printed specification, title of invention, for "TELETYPE CURRENT SUPPLY SYSTEM", each occurrence, read -- CURRENT SUPPLY SYSTEM --; column 1, line 17, column 3, lines 7, 8, 11, 17, 23, 26, 34 and 66, column 4, line 48 and column 7, line 21, for "teletype", each occurrence, read -- teletypewriter --; column 2, lines 7, 15 and 21, column 3, line 70, column 4, lines 27 and 67, column 7, line 37 and column 8, line 4, strike out "teletype", each occurrence; column 8, line 9, for "teletyping" read -- teletypewriting --; same column 8, line 18, for "teletype" read -- teletypewriters --.

Signed and sealed this 28th day of February 1967.

(SEAL)
Attest:

ERNEST W. SWIDER
Attesting Officer

EDWARD J. BRENNER
Commissioner of Patents